INVENTOR
PIETRO PADOVANI
By Shoemaker and Mattare
Attys.

INVENTOR
PIETRO PADOVANI
By Shoemaker and Mattare
Attys.

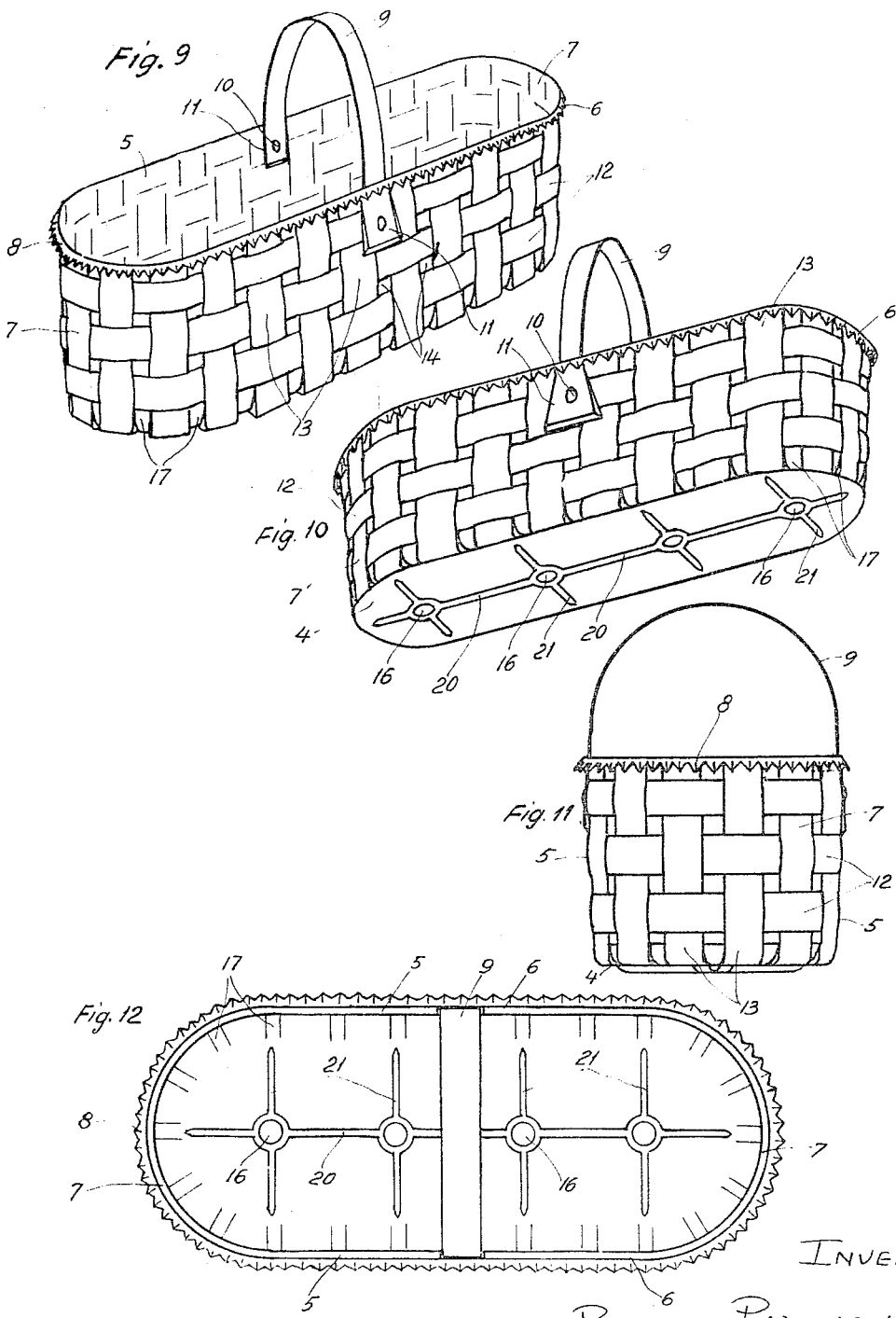

United States Patent Office 3,302,679
Patented Feb. 7, 1967

3,302,679
BASKETS, PANNIERS, BOWLS AND THE LIKE
Pietro Padovani, Chievo, Verona, Italy, assignor to
I.S.A.P., S.p.A., Chievo, Verona, Italy
Filed Feb. 15, 1965, Ser. No. 432,521
Claims priority, application Italy, Feb. 20, 1964,
4,051/64
25 Claims (Cl. 150—48)

This invention relates to baskets, panniers, bowls and other open topped containers, all of which are included hereafter in the term "basket."

The invention relates in particular to baskets of the kind made of thin flexible thermoplastics sheeting having side walls converging slightly in a downward direction reinforced by ribs and bounded at the top by a rim which is bent back outwardly and downwardly. Baskets of this kind are used inter alia for packing and transporting fruit and vegetables, and particularly strawberries, cherries and other soft fruits.

The object of the invention is to provide a basket of the kind referred to with an improved rib formation which also provides an effective decoration for the basket.

Another object of the invention is to provide a basket of the kind referred to having a shape and dimensions such that the baskets can be readily packed in crates or like portable containers provided with internal reinforcing corners.

According to the invention the side walls are reinforced between the rim and the base of the basket by outwardly or inwardly curved ribs each rib adjoining adjacent ribs at an angle. The length of the ribs is less than half the height of the basket and the ribs are spaced apart so that round or polygonal, protruding or recessed surfaces are formed between them, thus giving the impression of a trellis pattern. The surfaces will normally be polygonal.

The ribs may be arranged to meet each other substantially at right angles and the polygonal surfaces are formed between every two perpendicular pairs of adjacent ribs and are substantially rectangular. Alternatively, the ribs may be arranged to meet each other at an acute angle and the polygonal surfaces are formed between every two inclined pairs of adjacent ribs and have a substantially rhomboidal shape.

The accompanying diagrammatic drawings illustrate examples of baskets made in accordance with the invention. In the drawings:

FIG. 1 is a perspective view of one embodiment;
FIG. 2 is a plan view of the basket shown in FIG. 1;
FIG. 3 is a vertical section taken along the line X—X in FIG. 2;
FIGS. 4, 5 and 6 are partial views of various embodiments of the side walls of baskets with reinforcing ribs;
FIG. 7 is a perspective view of a basket having reinforcing ribs provided on its handle and adapted to hold the handle in its functional position;
FIG. 8 is a vertical section through one side of the handle and basket, showing the handle in its functional position, and
FIGS. 9, 10, 11 and 12 are respectively perspective views from above and below, an end elevation and a plan view of another embodiment.

In all the figures of the drawings like parts are denoted by like reference numerals.

The side wall of the basket, which converges towards the base portion 4, comprises two side portions 5 and two end portions 7 terminating at the top in rims 6 and 8 respectively. The rims are bent outwardly and have an arcuate vertical cross-section which is curved more or less sharply.

In order to give the top of the basket particular strength the rims 6 are straight whereas the rims 8 extend in a semicircle having a diameter equal to the spacing between the rims 6. The rims 8 are obviously joined to the rims 6 without forming corners, and the same applies to the frustoconical ends 7 and their connection to the side portions 5.

The basket may—as in the example illustrated—be provided with a handle 9 attached to the side portions 5 by tubular eyelets 10 (shoe eyelets) with widened ends.

The side portions 5 have central recesses 11 near the rim 6, which bear against the ends of the handle 9 in the operating position. The handle may become narrower towards the ends, that is to say, it need not be rectangular. The depth of the recesses 11 decreases to zero slightly above the eyelets 10 attaching the handle 9 to the side portions 5. The spacing between the eyelets 10 and the rims 6 is such that the ends of the handle do not overlap the rims 6 when the handle 9 is in the collapsed position shown in FIG. 3.

The handle 9 is mounted on the basket in the position shown in FIG. 3. The recess 11 hardly hinders the turning of the handle when the latter is brought into the functional position (see FIG. 1). When the handle 9 reaches the FIG. 1 position its ends move into the recesses 11 on account of the resilient flexibility of the material, and thus secure the handle in its functional position. The recesses 11 obviously do not prevent intentional rotation of the handle 9 even if the latter is provided, for example, with ribs 9' (see FIGS. 7 and 8) extending over part of the handle with their end portions abutting the rim 6 so as to hold the handle 9 in its functional position in cooperation with the recesses 11 but they do prevent the handle from unintentional, i.e. accidental, rotation.

The end portions 7 and side portions 5 of the side walls of the basket have ribs 12 and 13 (see FIG. 1) in the form of strips which are curved outwardly and arranged so as to reproduce the pattern of a basket made from wood ship strips, i.e. with strips spaced apart and interwoven in the shape of a Greek cross.

The quadrilaterals 14 bounded by the edges of pairs of strips 12 and 13 contribute greatly towards reinforcing the side walls of the basket. In baskets made of wood chips spaced apart and interwoven in a cross shape, on the other hand, such quadrilaterals would weaken the side walls since there would be gaps between the spaced strips.

In a basket made of interwoven wood chips the side walls are strongest if the strips are in contact with one another, whereas in a basket made in this way from thin plastic sheeting the side walls would be given less reinforcement than in the embodiment according to the invention.

The base portion 4, which is substantially flat, contains grooves 15 arranged in cross formation to collect the condensation and allow it to drain out through perforations 16.

The edges connecting the base 4 to the side walls of the basket are rounded and contain recesses 17 or reinforcing ribs which are directed inwardly and have a width which corresponds to that of the quadrilaterals 14 and are spaced apart by a distance equal to the width of the ribs 13.

FIG. 4 shows part of the side wall of a basket with strip-like outwardly curved ribs which are similar to those in FIG. 1 except that they also have reinforcing grooves 12' and 13' virtually dividing each of the ribs 12 and 13 into two adjacent strips.

The ribs may of course be arranged so that they are not perpendicular but are inclined to each other in which case they do not form any right angles. Rhomboidal surfaces may then be formed between the ribs 12'' and 13''.

The strip-like outwardly curved ribs may also be bounded by parallel marginal lines, the boundary lines diverging or converging towards one or both ends of the ribs.

Figure 1:
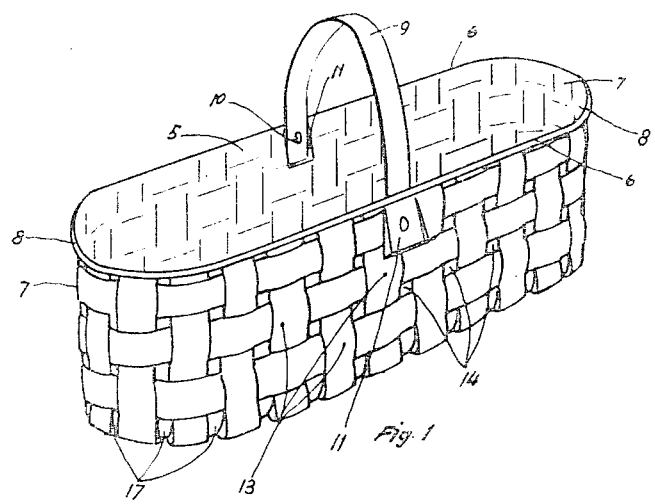
Figure 3:
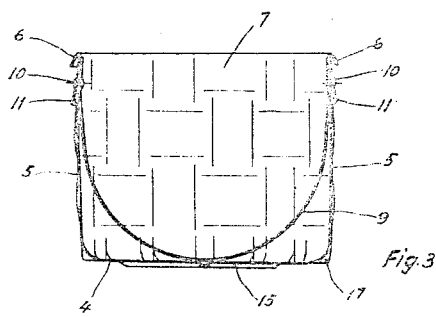
Figure 2:
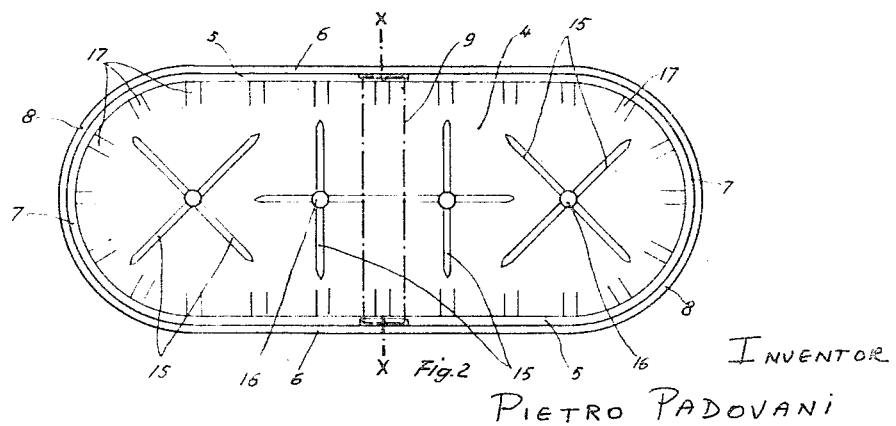
Figure 4:
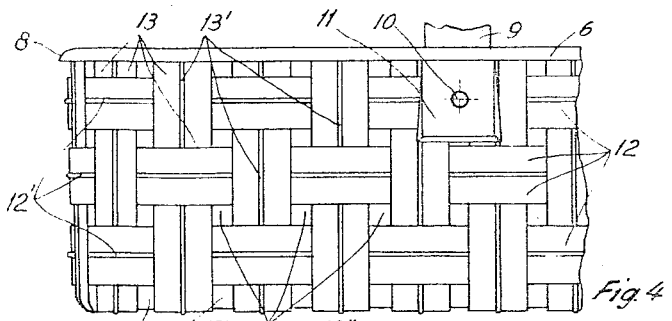
Figure 5:
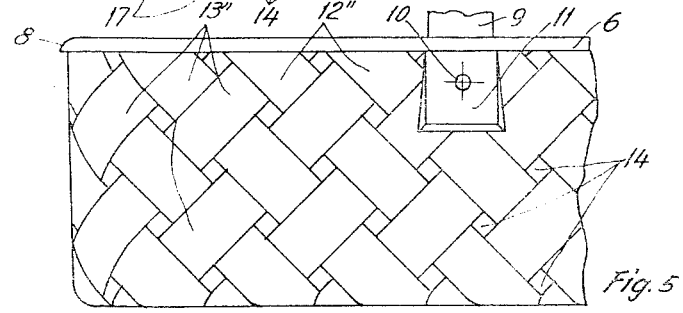
FIG. 5 shows part of the outer wall of a basket equivalent to that in FIG. 1. Here the strip-like outwardly curved ribs 12" and 13" are arranged so as to produce a trellis pattern in the form of Saint Andrew's crosses.
Figure 6:
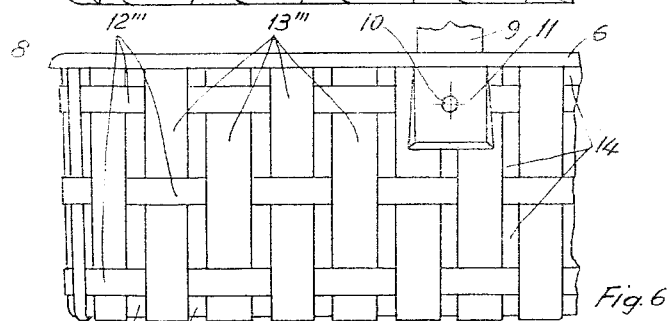
FIG. 6 illustrates part of the side wall of a basket with strip-like outwardly curved ribs 12''' and 13''' arranged to form a trellis pattern of Roman crosses.
Figure 7:
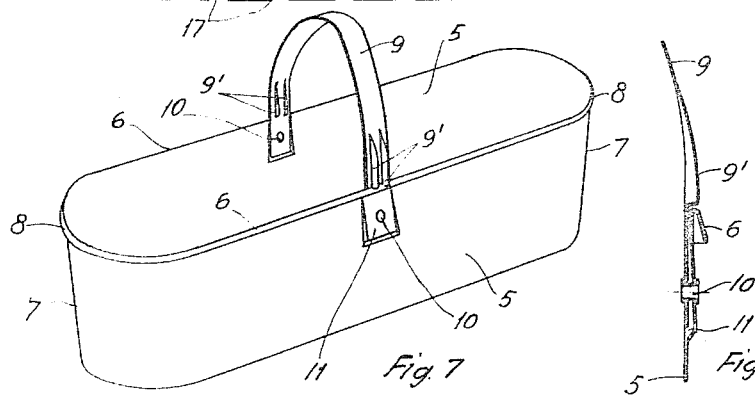
Figure 8:
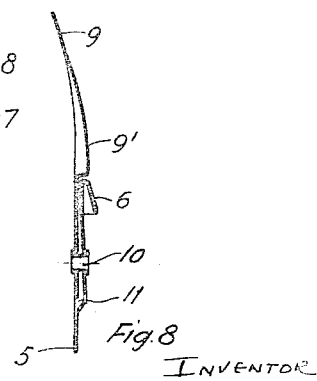

The embodiment shown in FIGS. 9 to 12 differs from that shown in FIGS. 1 to 3 in that the outwardly bent rims 6, 8 are a little deeper and the lower edges of these rims are indented or serrated. Moreover, in this embodiment, the grooves in the bottom of the basket are arranged somewhat differently and comprise a longitudinal groove 20 extending continuously between transverse grooves 21.

The patterns on the outside of the basket may be varied while keeping the side walls at virtually the same thickness, by curving the strip-like ribs inwardly instead of outwardly.

The quadilaterals 14 may take a large variety of forms. Their boundary edges may be bent, for example, so as to convert the quadrilateral into a circle or a polygon or figure of other composition.

The side portions 5 may differ in length, height and spacing. The length could also be zero (round embodiment).

The reinforcing ribs for the side walls and the gaps between them may in practice be substantially different without thereby going beyond the scope of the possible embodiments of the invention.

When the basket is in the form of a bowl the base of the bowl might be curved and merge gradually into the side walls.

I claim:

1. A basket made of thin flexible thermoplastics sheeting for fruit or the like, said basket having a base, side walls secured to said base and diverging in a direction away from the base, and a rim bounding the top of said side walls, said rim being bent back outwardly and downwardly, said side walls being reinforced between said rim and said base by ribs, and the length of said ribs being less than half the height of said side walls, wherein each rib adjoins adjacent ribs at an angle and wherein said ribs are spaced apart so that appropriately shaped surfaces are formed between them, the arrangement of ribs and surfaces giving the impression of a trellis pattern.

2. A basket according to claim 1, wherein said surfaces are polygonal.

3. A basket according to claim 1, wherein said surfaces are round.

4. A basket according to claim 1, wherein said ribs are curved outwardly and wherein said polygonal surfaces are recessed between said ribs.

5. A basket according to claim 1, wherein said ribs are curved inwardly and wherein said polygonal surfaces protrude between said ribs.

6. A basket according to claim 1, wherein each rib has a broad external strip extending throughout its length.

7. A basket according to claim 1, wherein each rib has a broad internal strip extending throughout its length.

8. A basket according to claim 1, wherein said ribs are arranged to meet each other substantially at right angles, wherein the polygonal surfaces are formed between every two perpendicular pairs of adjacent ribs and wherein said polygonal surfaces are substantially rectangular.

9. A basket according to claim 1, wherein said ribs are arranged to meet each other at an acute angle, wherein the polygonal surfaces are formed between every two inclined pairs of adjacent ribs and wherein said polygonal surfaces have a substantially rhomboidal shape.

10. A basket according to claim 1, wherein said ribs are substantially strip-like.

11. A basket according to claim 10, wherein the boundary lines of said strip-like ribs are parallel to each other.

12. A basket according to claim 10, wherein the boundary lines of said strip-like ribs converge or diverge slightly.

13. A basket according to claim 10, wherein said strip-like ribs are bounded at least in their central zone by lines bent towards the centre lines of said ribs.

14. A basket according to claim 10, wherein said strip-like ribs are subdivided by grooves extending approximately along the longitudinal centre line of said ribs.

15. A basket according to claim 10, wherein the surface of said strip-like ribs has a cobblestone-like formation.

16. A basket according to claim 1, wherein the longitudinal side and top portions of said side walls form a gradually merging curved surface in the peripheral direction.

17. A basket according to claim 1, wherein the cross section of the rim corresponds to the wide arcuate portion of an ellipse or any other flat arc.

18. A basket according to claim 1, wherein the rib has a cross section corresponding to the narrow arcuate portion or an ellipse or any other sharply curved arc.

19. A basket according to claim 1, having a pivotable handle articulated to said basket below the rim, wherein recesses are provided in the side walls of said basket said recesses being adapted to receive the end portions of said handle when said handle is in its functional position, to hold said handle in said functional position.

20. A basket according to claim 19, wherein said handle is substantially strip-like.

21. A basket according to claim 19, wherein said recesses are formed by boundary lines on said ribs.

22. A basket according to claim 19, wherein said recesses match the side edges of the ends of said handle in its functional position and gradually taper upwardly from their maximum depth at the bottom to reach zero value approximately at the level of the articulating means securing said handle to said basket.

23. A basket according to claim 1, having a pivotable handle articulated to said basket below the rim, wherein ribs are provided longitudinally or transversely of said handle, said ribs being of such length that they only abut the rim of said basket when said handle is in its functional position.

24. A basket according to claim 1 wherein the edge of said outwardly and downwardly turned rim is indented or serrated.

25. A basket according to claim 1 wherein the base of said basket is formed with drainage apertures and grooves communicating with the drainage apertures, the grooves serving to collect condensation and lead it to the drainage apertures.

References Cited by the Examiner

UNITED STATES PATENTS

| | | | |
|---|---|---|---|
| D. 15,472 | 10/1884 | Mehl | 87—3 |
| 941,014 | 11/1909 | Doble | 220—72 X |
| 2,935,108 | 5/1960 | Hall | 150—48 |
| 2,979,844 | 4/1961 | Lattuca | 150—48 |
| 3,111,153 | 11/1963 | Souka et al. | 150—48 |
| 3,180,385 | 4/1965 | Kuroda | 150—48 |

FRANKLIN T. GARRETT, *Primary Examiner.*